(12) United States Patent
Charny et al.

(10) Patent No.: US 6,778,492 B2
(45) Date of Patent: Aug. 17, 2004

(54) LOAD BALANCING FOR FAST REROUTE BACKUP TUNNELS

(75) Inventors: Anna Charny, Sudbury, MA (US); Robert James Goguen, Acton, MA (US); Carol Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 12 days.

(21) Appl. No.: 10/052,665

(22) Filed: Jan. 17, 2002

(65) Prior Publication Data

US 2004/0052207 A1 Mar. 18, 2004

(51) Int. Cl.[7] ............................................. H04L 12/28
(52) U.S. Cl. ..................................................... 370/228
(58) Field of Search ................................ 370/217, 228, 370/219, 220, 225, 227

(56) References Cited

U.S. PATENT DOCUMENTS

| | | | | |
|---|---|---|---|---|
| 5,020,052 A | | 5/1991 | Deprycker et al. ............ | 370/60 |
| 5,717,796 A | * | 2/1998 | Clendening .................. | 385/24 |
| 5,850,505 A | * | 12/1998 | Grover et al. .................. | 714/4 |
| 6,023,452 A | * | 2/2000 | Shiragaki ..................... | 370/227 |
| 6,229,787 B1 | * | 5/2001 | Byrne .......................... | 370/218 |
| 6,246,667 B1 | * | 6/2001 | Ballintine et al. ........... | 370/224 |
| 6,363,319 B1 | * | 3/2002 | Hsu ............................. | 701/202 |
| 2001/0019554 A1 | * | 9/2001 | Nomura et al. .............. | 370/389 |
| 2002/0004843 A1 | * | 1/2002 | Andersson et al. .......... | 709/238 |
| 2003/0117950 A1 | * | 6/2003 | Huang ......................... | 370/220 |

OTHER PUBLICATIONS

R. Braden, et al. "Resource ReSerVation Protocol (RSVP)—Version 1 Functional Specification," RFC 2205, Internet Engineering Task Force, Sep. 1997.

D. Awduche, et al. "Requirements for Traffic Engineering Over MPLS," RFC 2702, Internet Engineering Task Force, Sep. 1999.

E. Rosen, et al. "Multiprotocol Label Switching Architecture," RFC 3031, Internet Engineering Task Force, Jan. 2001.

D. Gan, et al. "A Method for MPLS LSP Fast–Reroute Using RSVP Detours," Internet Draft, Internet Engineering Task Force, Apr. 2001.

J. P. Lang, et al. Generalized MPLS Recovery Mechanisms, Internet Draft, Internet Engineering Task Force, Jun. 2001.

P. Ashwood–Smith, et al. Generalized MPLS Signaling—RSVP–TE Extensions, Internet Draft, Internet Engineering Task Force, Oct. 2001.

Pan, et al. "Fast Reroute Techniques in RSVP–TE," Internet Draft, Internet Engineering Task Force, Nov. 2001.

F. LeFaucheur, et al. "Requirements for Support of Diff–Serv–aware MPLS Traffic Engineering," Internet Draft, Internet Engineering Task Force, Nov. 2001.

* cited by examiner

Primary Examiner—Chi Pham
Assistant Examiner—Nhat Do
(74) Attorney, Agent, or Firm—Ritter, Lang & Kaplan LLP

(57) ABSTRACT

Load balancing among fast reroute backup tunnels in a label switched network is achieved. M backup tunnels may be used to protect N parallel paths. A single backup tunnel may protect multiple parallel paths, saving on utilization of network resources such as router state and signaling information. A single path may be protected by multiple backup tunnels, assuring that bandwidth guarantees are met under failure conditions even when no one backup tunnel with sufficient bandwidth may be found. A packing algorithm is used to associate individual label switched paths (LSPs) with individual backup tunnels. If an LSP cannot be assigned to a backup tunnel, it may be either rejected, or additional bandwidth is allocated to existing backup tunnels, or a new backup tunnel is established.

14 Claims, 6 Drawing Sheets

LOAD BALANCING FOR FAST REROUTE BACKUP TUNNELS

STATEMENT OF RELATED APPLICATIONS

The present application is related to the subject matter of U.S. patent application Ser. No. 10/038,259, entitled "Implicit Shared Bandwidth Protection for Fast Reroute", filed on Jan. 2, 2002, the contents of which are herein incorporated by reference in their entirety.

BACKGROUND OF THE INVENTION

The present invention relates to data networking and more particularly to systems and methods for providing fault tolerance to data networks.

As the Internet becomes a multi-media communications medium that is expected to reliably handle voice and video traffic, network protocols must also evolve to support quality-of-service (QoS) requirements such as latency and reliability and to provide guaranteed available bandwidths. One form that this evolution is taking is the advent of MPLS (Multi-Protocol Label Switching) Traffic Engineering which may be supplemented by Diffserv-aware Traffic Engineering. Rather than using conventional IP routing techniques where individual packets travel through the network following paths determined individually for each packet as it progresses through the network, MPLS Traffic Engineering exploits modem label switching techniques to build guaranteed bandwidth end-to-end circuits through a network of label switched routers (LSRs). MPLS has been found to be highly useful in establishing such circuits also referred to as label switched paths (LSPs). MPLS networks employing LSPs can more easily interoperate with other IP-based networks than other virtual circuit-oriented networks employing, e.g., ATM or Frame Relay. Networks based on MPLS Traffic Engineering, especially those supplemented with DiffServ-aware Traffic Engineering are very effective in handling delay and jitter-sensitive applications such as voice over IP (VoIP) and real-time video.

Meeting the demands of businesses and consumers, however, also requires that bandwidth and latency guarantees continue to be met when links or nodes fail. When failure of a link or a node causes the failure of an LSP, the standard routing protocols such as constraint-based shortest path first (CSPF) are too slow to be used for dynamic rerouting of QoS-sensitive traffic. In optical networks employing SONET, fast restoration can be provided by means of features incorporated into the SONET protocol. However, where such techniques are not available, other protection mechanisms become necessary to ensure that services are restored within a sufficiently short time, e.g., 50 ms, such that the user experience is not affected.

To address this requirement, various fast reroute techniques have been developed that provide rapid reaction to failure of a link or node such that the user experience is preserved. In one such approach, individual nodes and links are protected against failure by establishing local backup tunnels (also implemented as LSPs) that are used to reroute all traffic around the failure. To protect a link, a backup tunnel is established connecting the two nodes that the protected link connects without including the protected link in the backup tunnel. To protect a node, a backup tunnel protects each pair of links traversing the node. If bandwidth protection is desired, each backup tunnel should have an allocated bandwidth.

Certain problems arise in implementing this backup scheme. To guarantee quality of service under failure conditions, the backup tunnel should have at least as much bandwidth as the primary bandwidth of the protected element (e.g., link or node in this context) or alternatively, at least as much bandwidth as consumed by LSPs that employ the protected element. However, it may be impossible to find a series of links to make up a single backup tunnel where each link has the required bandwidth. This is particularly true when network bandwidth is generally scarce.

Another concern is inefficient use of backup tunnels to protect parallel links that would fail together due to, e.g., a fiber cut, or parallel link pairs that would fail due to a node failure. One prior art approach allocates a separate backup tunnel to protect each link or path, or even to protect a single LSP, wasting valuable network resources such as router state, signaling resources, etc. Another prior art approach creates m backup resources to protect n primary resources but this approach is based on an assumption that only m of the n resources can fail simultaneously.

SUMMARY OF THE INVENTION

By virtue of one embodiment of the present invention, load balancing among fast reroute backup tunnels in a label switched network is achieved. M backup tunnels may be used to protect N parallel paths all of which can fail simultaneously. A single backup tunnel may protect multiple parallel paths, saving on utilization of network resources such as router state and signaling information. A single path may be protected by multiple backup tunnels, assuring that bandwidth guarantees are met under failure conditions even when no one backup tunnel with sufficient bandwidth may be found. A packing algorithm is used to associate individual label switched paths (LSPs) with individual backup tunnels.

When there is no possible assignment of LSPs to backup tunnels that provides sufficient backup bandwidth for each LSP, a new primary LSP may be either rejected, or alternatively a new backup tunnel may be established for the new LSP, or the bandwidth of the existing backup tunnels may be increased.

One aspect of the present invention provides a method for providing fast reroute protection in a label switched network. The method includes: identifying N paths to be protected together in the event all of them fail at the same time, the N paths originating at a first selected node of the label switched network and terminating at a second selected node of the label switched network, identifying M backup tunnels to protect the N selected paths, and selecting for each of a plurality of label switched paths employing any of the N selected paths, one of the M backup tunnels as a backup to use upon failure. N or M is greater than or equal to 2.

Further understanding of the nature and advantages of the inventions herein may be realized by reference to the remaining portions of the specification and the attached drawings.

DESCRIPTION OF SPECIFIC EMBODIMENTS

MPLS Traffic Engineering Network Environment

Figure 2:
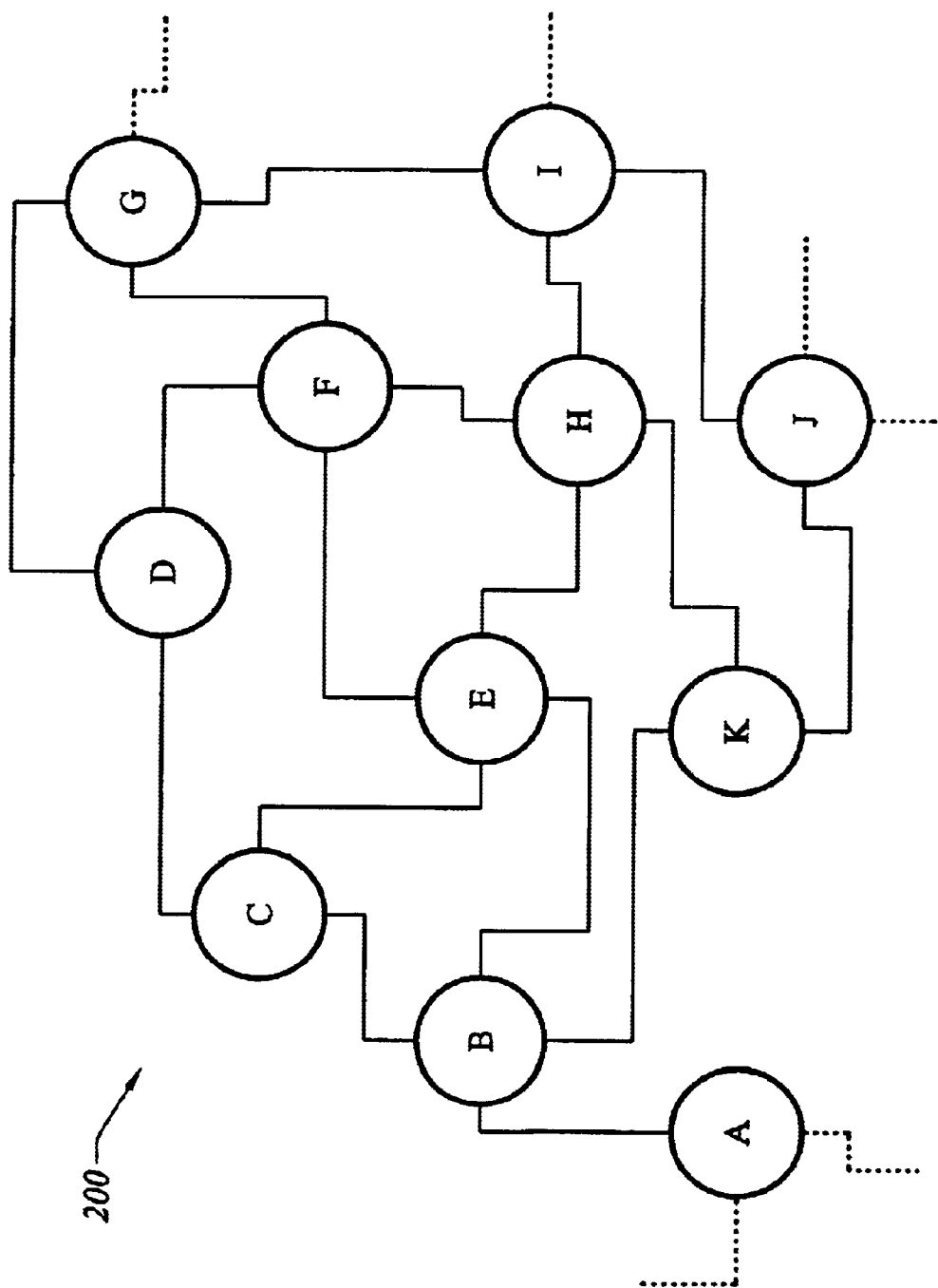
FIG. 2 depicts a network suitable for implementing one embodiment of the present invention.

The present invention will be described with reference to a representative network environment that employs a certain combination of network protocols to forward data through the network. FIG. 2 depicts a representative network 200 including nodes A through K. Interconnecting the nodes of network 200 are individual links xy where x identifies one endpoint of the link and y identifies the other one. The links may be implemented using any type of physical medium such as e.g., an optical medium, a wireless medium, twisted pair, etc.

In one embodiment, the nodes of network 200 interoperate in a manner specified by various protocols including, e.g., TCP/IP as known in the art, suitable link layer protocols such as Link Management Protocols (LMP), and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Le Faucheur, et al., "Requirements for Support of Diff-Serv-Aware MPLS Traffic Engineering," Internet Draft, Internet Engineering Task Force, November 2001.

Pan, et al., "Fast Reroute Techniques in RSVP-TE," Internet Draft, Internet Engineering Task Force, October 2001.

The contents of the above protocol documents are all herein incorporated by reference in their entirety for all purposes. Other suitable protocols as known in the art may also be implemented by nodes of network 200.

In one embodiment, the nodes of network 200 are IP routers that implement multiprotocol label switching (MPLS) and essentially operate as label switched routers (LSRs). At the ingress to network 200, a label is assigned to each incoming packet before forwarding the packet to the next hop node. At each intermediate node, a forwarding selection and a new substitute label are determined by using the label found in the incoming packet as a reference to a label forwarding table that includes this information. At the network egress (or one hop prior), a forwarding decision is made based on the incoming label but no label is included when the packet is sent on to the next hop.

It is desirable to provide end-to-end circuits across network 200 having guaranteed bandwidth, latency, jitter, etc. This is provided by employing MPLS Traffic Engineering (MPLS TE) and/or Diffserv-Aware Traffic Engineering. MPLS TE essentially builds and operates end-to-end circuits across LSRs by appropriately controlling the contents of the label forwarding tables at the various LSRs of network 200. Each end-to-end circuit is referred to as a Label Switched Path (LSP). Each LSP traverses a series of nodes and interconnecting links.

MPLS Traffic Engineering Fast Reroute

General MPLS TE fast reroute concepts will now be discussed to facilitate the discussion of systems and methods of the present invention. It is desirable that network 200 provide very high reliability to support Internet services such as voice telephony and video conferencing where such a level of reliability is both expected and necessary. Accordingly, it is desired that when a node or a link fails such that all the LSPs employing that failed link or node are rerouted very quickly (e.g., under 50 ms) so that the user experience is not affected by the failure. When a given LSP in a network employing MPLS TE experiences a node failure, the head-end, i.e., the ingress, will automatically establish a new LSP as a substitute. However, this process requires far longer than desirable. The failure of a single node may require the reestablishment of a large number of LSPs (e.g. as many as 2000). Accordingly, a local fast reroute capability is provided so that when a node or a link fails, an LSP is temporarily rerouted around the failed link or node while a new end-to-end LSP is being established at the head-end. Besides links and nodes, other examples of elements that may be protected by fast reroute in accordance with the present invention include, e.g., groups of links, an LSP or group of LSPs, or any group of links and/or nodes protected together by one or more backup tunnels having the same source and destination.

A failure is detected, preferably within 10 ms. A link or node failure may detected, e.g., at the link layer or by failure to receive an expected RSVP HELLO message (or by any other method). Once a failure of an element is detected, traffic from each primary LSP traversing the failed element is redirected to the backup tunnels pre-established to protect the failed element. At the node where the backup tunnel starts (called the head-end of the backup tunnel), packets traversing an impacted LSP have a second level label imposed on their label stacks. This second level label is the basis for forwarding decisions through the backup tunnel. At each successive node of the backup tunnel, the second level label is used to select a next hop and a substitute second level label. At the final node of the backup tunnel, or alternatively at the penultimate node of the backup tunnel, this second level label is popped off the packet label stack so that the packet thereafter follows the original path of the LSP.

The LSP head-ends of all affected primary LSPs are also notified of the failure so that the LSP that is now rerouted via the backup tunnel can be rerouted in a more optimal way. The details of the mechanics of patching in backup tunnels and reacting to the failure of protected elements are disclosed in the Internet Draft entitled "Fast Reroute Techniques in RSVP-TE." It should be noted that besides a link or node, according to one embodiment of the present invention, a protected element may be a group of links, an LSP, a group of LSPs, or any grouping of links and/or nodes protected together by one or more backup tunnels having the same source and destination.

On each link in the network, there is primary bandwidth allocated for use by primary LSPs. The concept of primary bandwidth is discussed in greater detail in the above-referenced application entitled "Implicit Shared Bandwidth Protection for Fast Reroute." In one embodiment of this invention, a primary pool includes the maximum amount of bandwidth that can be allocated to primary LSPs at any time. In another embodiment, the primary bandwidth may be the actual bandwidth currently used by primary LSPs (which may be smaller than the maximum bandwidth pool allocated for primary LSPs). There is also a backup bandwidth pool allocated for use by backup tunnels. The backup bandwidth pool is always the maximum amount of bandwidth that is allocated for backup traffic, regardless of how much bandwidth is actually backed up on the link.

For implementations that employ MPLS-TE without DS-TE, the primary bandwidth pool includes bandwidth equivalent to a defined maximum reservable bandwidth for LSPs or, alternatively, bandwidth equivalent to the bandwidth actually used by LSPs. A backup bandwidth pool is established on each link and preferably contains a bandwidth equivalent to the link speed minus the maximum reservable bandwidth.

It is also possible to allow limited "overbooking" in the event of failure of an element protected by the link such that total bandwidth reservations on the link exceed link capacity and then rely on TCP operation to adjust in response to the shortfall. In this type of implementation, the backup bandwidth pool may exceed the link speed minus the maximum reservable bandwidth.

For implementations that employ DS-TE, the primary bandwidth can be, e.g., the maximum reservable bandwidth of a particular bandwidth "subpool" as this term is defined by the document cited above entitled "Requirements for Support of Diff-Serv-Aware MPLS Traffic Engineering." The backup bandwidth pool then, for example, includes a configurable fraction of the remaining bandwidth on the link.

The backup tunnels may be preconfigured in a variety of ways. In one approach, the backup tunnels protecting a given node are signaled as employing zero bandwidth so that backup bandwidth capacity is readily shared among independent failures. There is, however, bookkeeping to assure that the backup tunnels protecting the same node do not exceed the available backup bandwidth on links employed by the tunnels. Further details of this approach are found in U.S. patent application Ser. No. 10/038,259, entitled "Implicit Shared Bandwidth Protection for Fast Reroute". In other approaches, the backup tunnels are signaled with non-zero bandwidth.

In one embodiment, the backup tunnels for protecting a node are determined at the protected node while the backup tunnels for a link are determined at one of the link ends. Alternatively, the computation of backup tunnels for a node that is being protected by these tunnels is shifted to that node itself. Yet another alternative is for the computation of the backup tunnels for any element to be done by a separate server. The particular locus of the backup tunnel computation is not important to the operation of the present invention.

A backup tunnel protecting a link connects the two nodes that the protected link connects without including the protected link. A node is protected by protecting each link pair that includes a link to the node and a link from the node. A backup tunnel protects such a link pair by connecting the two nodes connected to the protected nodes by the link pair. A link or a link pair are two examples of what are referred to herein as "paths" protected by backup tunnels. Other examples include a set of LSPs traversing the same pair of nodes or a multi-hop path traversing the same set of links connecting some two nodes.

To protect a path with guaranteed bandwidth, it is necessary to provide at least as much backup bandwidth as is used by the primary LSPs employing the protected path. Where network bandwidth is scarce, it may sometimes be impossible to establish a single backup tunnel with sufficient bandwidth to accommodate the LSPs on a given path.

Association of M Backup Tunnels within N Parallel Paths

Figure 3:
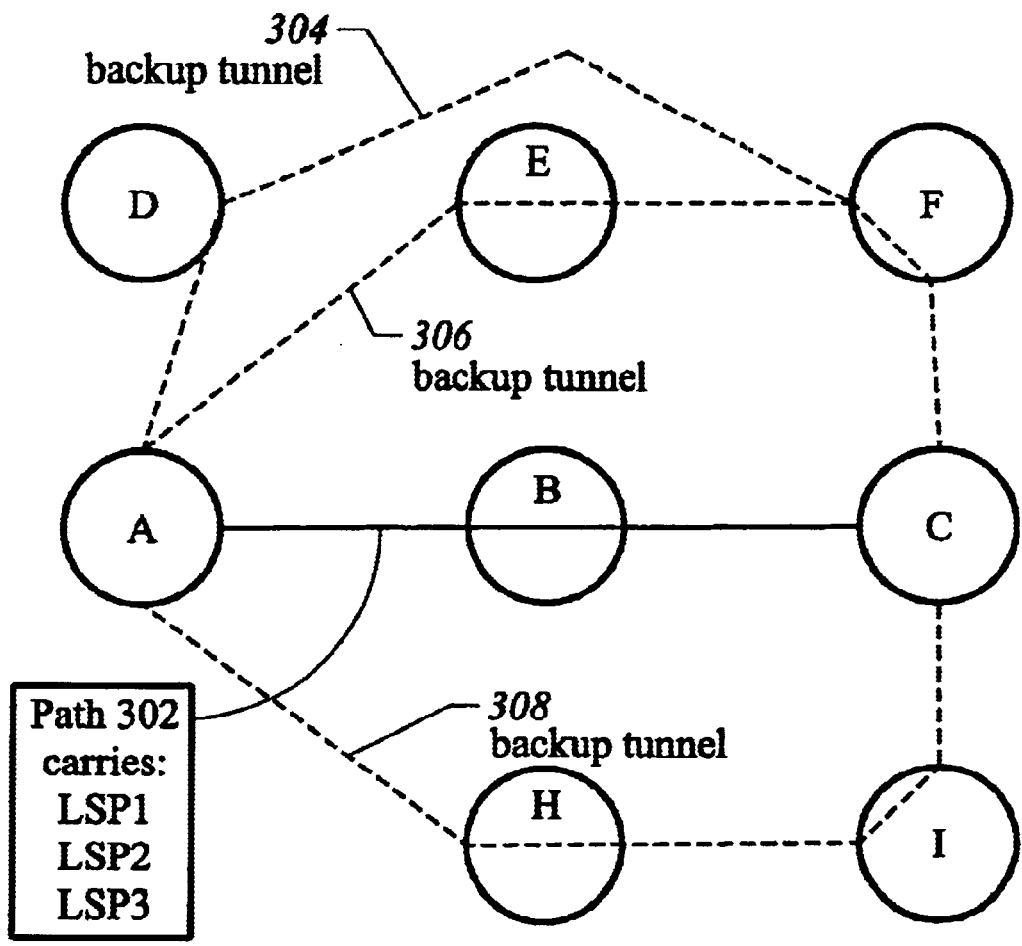
FIG. 3 depicts a situation where a single path is protected by multiple backup tunnels according to one embodiment of the present invention.

According to one embodiment of the present invention, two or more backup tunnels may protect a single path. For example, consider the situation in FIG. 3. A path 302 traverses nodes A, B, and C. As part of the protection of node B, multiple backup tunnels protect this path. Path 302 currently is employed by LSP1, LSP2, and LSP3. The backup bandwidth to protect path 302 was not available on any one backup tunnel so three backup tunnels were established. Backup tunnel 304 connects nodes A and C through nodes D and F. Backup tunnel 306 connects nodes A and C through nodes E and F. Backup tunnel 308 connects nodes A and C through nodes H and I. In FIG. 3, path 302 is a link pair but it will be appreciated that the backup capacity for protecting a single link may also be divided among multiple tunnels.

Figure 4:
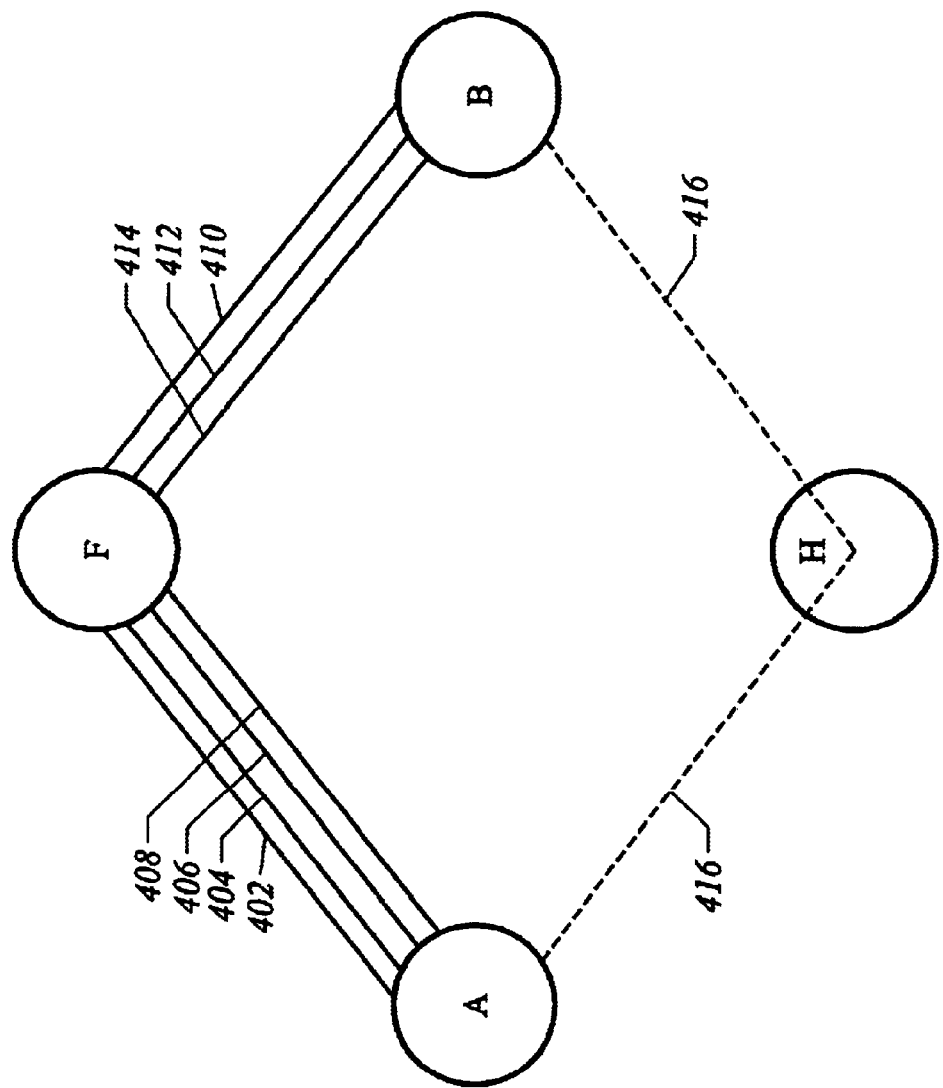
FIG. 4 depicts a situation where multiple parallel paths are protected by a single backup tunnel according to one embodiment of the present invention.

Another situation that arises in providing fast reroute protection is the protection of parallel paths, i.e., paths that have common originating and terminating nodes. Such paths may traverse the same node so that the failure of that node will cause the paths to fail together. For example, referring now to FIG. 4, there are 4 parallel links 402, 404, 406, and 408 connecting nodes A and F and 3 parallel links 410, 412, and 414, connecting nodes F and B. If node F fails, all 7 of these links will fail simultaneously.

In order to protect all primary traffic from A to B via F, conventional techniques would have to protect individually traffic flowing on all combinations of the 4 links connecting A and F and the 3 links connecting F and B. So at least 12 backup tunnels would need to be created to protect all primary traffic from A to B via F by conventional techniques. However, there may be enough bandwidth available in the network to protect the entire bandwidth of all primary traffic from A to B via F by a single backup tunnel. According to one embodiment of the present invention, a single backup tunnel 416 beneficially connects A and B bypassing F and has enough bandwidth to protect all primary traffic from A to B via F. The use of a single backup tunnel here conserves signaling resources and the amount of state in the network. In the case where a single backup tunnel with enough bandwidth to protect all primary traffic from A to B via F cannot be found, it is beneficial to create the smallest number of backup tunnels that can protect all primary traffic from A to B via F.

A similar situation occurs when multiple parallel links connecting the same two nodes belong to the same fiber, and may therefore fail simultaneously if that fiber is cut. It is preferable in that case to protect all such links by a single backup tunnel or the smallest number of backup tunnels with enough combined bandwidth to protect all primary traffic between the two nodes.

Figure 5:
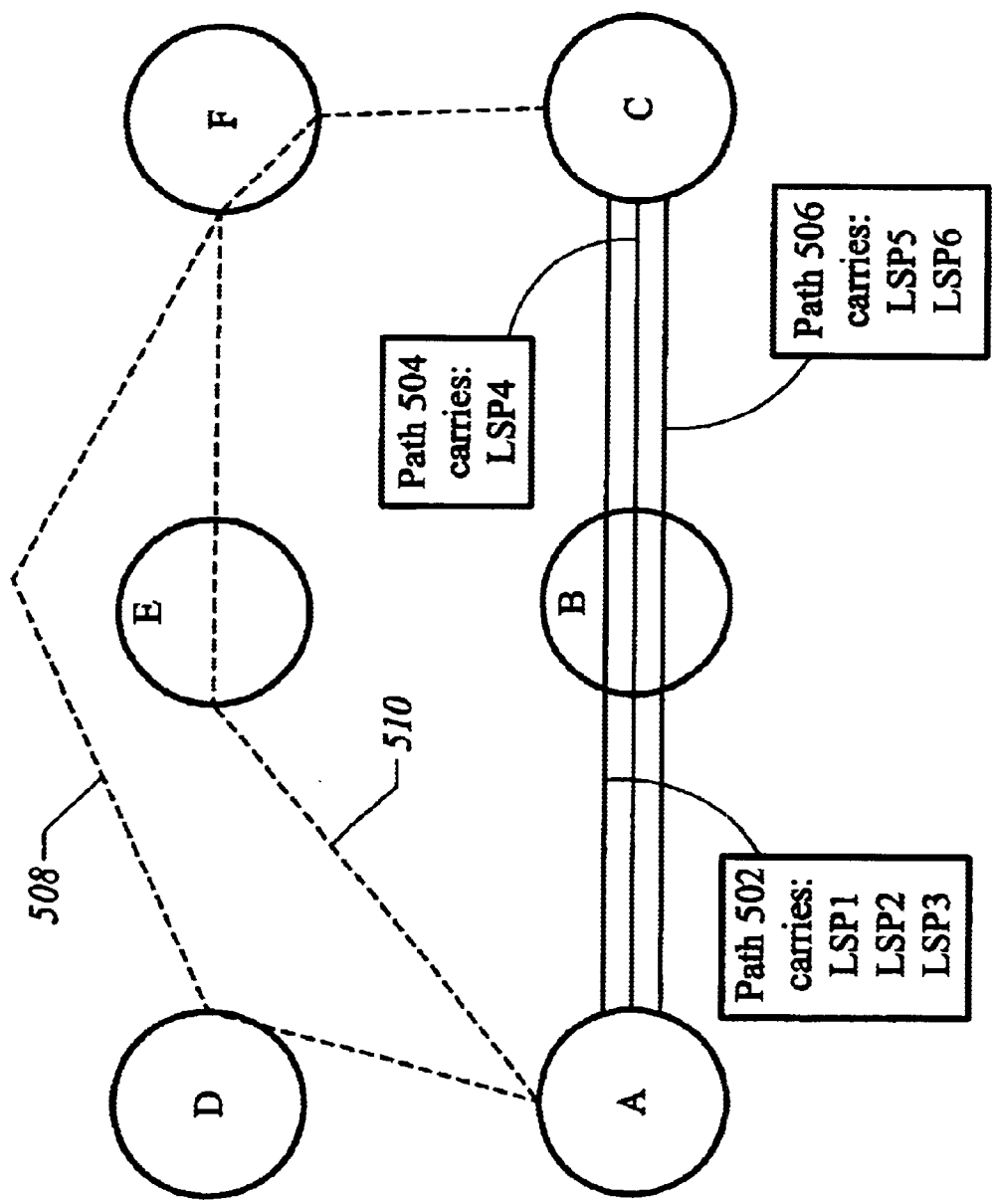
FIG. 5 depicts a situation where multiple parallel paths are protected by multiple backup tunnels according to one embodiment of the present invention.

FIG. 5 depicts a situation according to one embodiment of the present invention where three parallel paths are protected by two backup tunnels. Three paths 502, 504, and 506 traverse node B. Path 502 currently carries LSP1, LSP2, and LSP3, path 504 carries LSP4, and path 506 carries LSP5 and LSP6. Two backup tunnels 508 and 510 protect the three paths.

More generally, according to one embodiment of the present invention, M backup tunnels may protect N paths where either M or N is greater than or equal to 2. This provides load balancing to spread backup requirements among multiple tunnels while aggregating backup requirements where possible to minimize consumption of signaling and routing state resources. It should be noted that this approach is different than prior art solutions that create m backup resources to protect n primary resources, only m of which can fail simultaneously. Here all N paths may fail simultaneously and all be protected.

Mechanisms involved in supporting this M to N mapping include:
1. Associating multiple protected paths with one or more backup tunnels.
2. Associating a single backup tunnel with multiple parallel paths.
3. Associating each individual LSP with a particular backup tunnel.

The discussion will now expand on mechanism 3. To reroute quickly upon detection of a failure and to make sure that there is enough bandwidth on the backup tunnels to protect an LSP in the event of failure, it is preferable that LSPs be assigned to backup tunnels in advance of failure and that the backup tunnel head end (node A in FIG. 4) be aware of these assignments. The assignments should match the bandwidth requirements of the LSPs to the capacities of the backup tunnels. The assignments are preferably determined at the tunnel head end. If a zero-bandwidth reservation scheme is used, each node should locally store the bandwidth associated with each backup tunnel for which this node is the head end, so that the LSPs can be assigned correctly. It should be noted that even though a zero bandwidth reservation scheme may be used in establishing the backup tunnels, the placement may be computed in such a way such that the bandwidth logically associated with each backup tunnel is sufficient to support the requirements imposed in case of a single element failure. See "Implicit Shared Bandwidth Protection for Fast Reroute," cited above.

For example, in the scenario of FIG. 5, LSPs may be assigned to backup tunnels as follows:

| Backup Tunnel | 508 | 510 |
| --- | --- | --- |
| Available Bandwidth on the backup tunnel | 150 Mbps | 150 Mbps |
|  | LSP1 10 Mbps | LSP4 20 Mbps |
|  | LSP2 40 Mbps | LSP5 20 Mbps |
|  | LSP3 40 Mbps | LSP6 20 Mbps |

Figure 6:
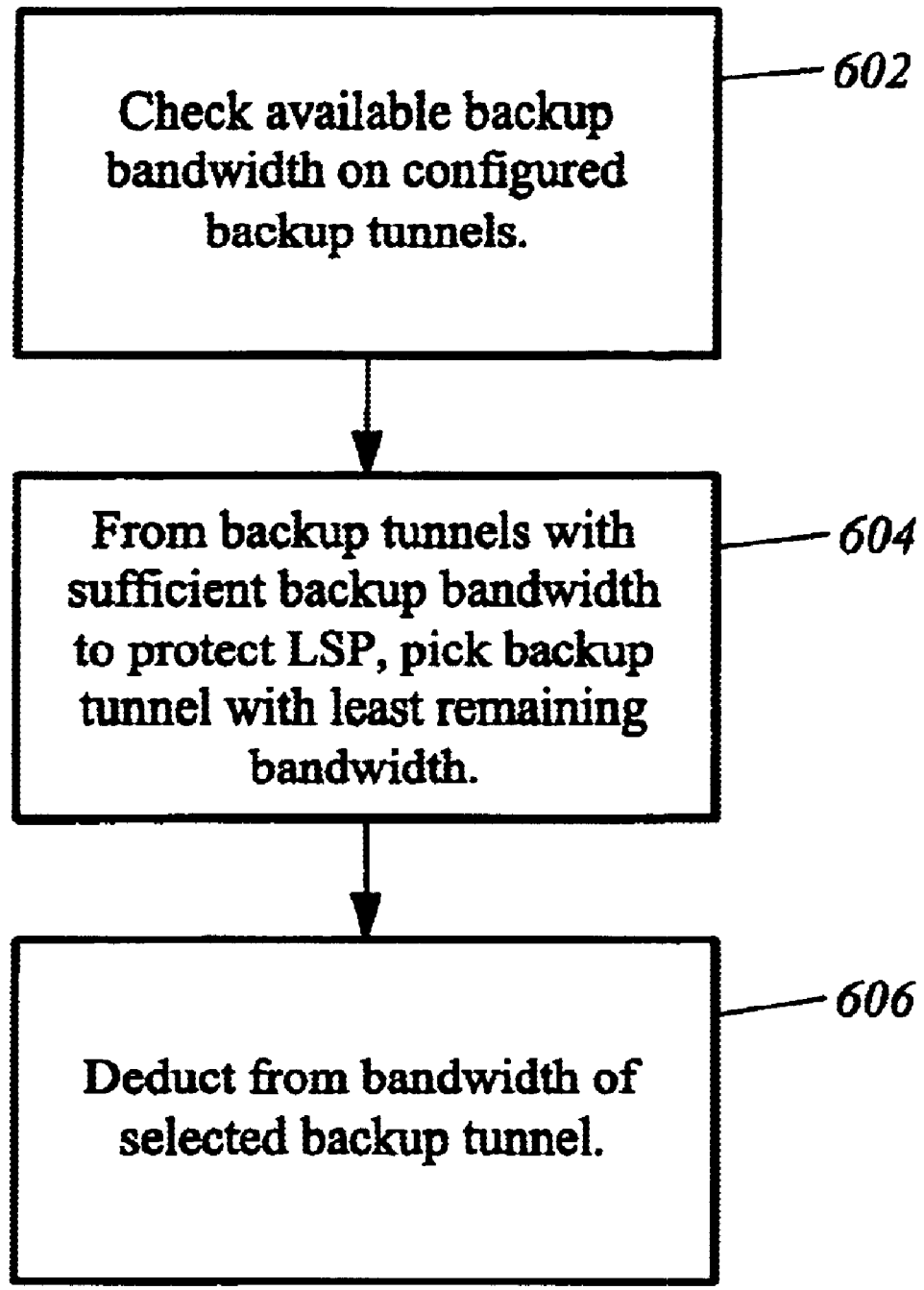
FIG. 6 is a flowchart describing steps of assigning an LSP to a backup tunnel according to one embodiment of the present invention.

Preferably, a packing algorithm is employed to assign LSPs to backup tunnels. A given node will invoke the packing algorithm independently for each set of backup tunnels originating at that node that protect the same element. For example, in the situation of FIG. 5, the packing algorithm may be operated at node A to assign all the LSPs traversing protected node A (and thus parallel paths 502, 504, and 506) to one of backup tunnels 508 and 510. A separate invocation of the packing algorithm would be used to assign LSPs traversing some other protected element to backup tunnels protecting that other protected element. FIG. 6 describes steps of assigning an LSP to a backup tunnel. At step 602, the available bandwidth is checked on all the backup tunnels that have been set up for the protected path(s). At step 604, the algorithm selects from any of the backup tunnels having sufficient remaining bandwidth to protect the LSP, the backup tunnel that has the least available bandwidth. The LSP is assigned to this backup tunnel. At step 606, the bandwidth requirement of the LSP is deducted from the available bandwidth of the selected backup tunnel.

In some implementations, backup tunnels are established after the primary LSPs are already established. The procedure of FIG. 5 will then be repeated for each LSP passing through the protected path. Alternatively, the backup tunnels protecting the primary bandwidths pool are set up in advance of the establishment of any LSPs. The procedure of FIG. 5 would then be invoked upon the establishment of a new LSP.

It will be appreciated that even when the total bandwidth of the backup tunnels exceeds the total bandwidth of the LSPs employing the protected paths, it is possible that there is no possible assignment of LSPs to backup tunnels that will satisfy the LSPs' bandwidth requirements. Consider a situation where 3 LSPs each having a capacity of 30 Mbps share the same path of the total capacity of 100 Mbps that is protected by two backup tunnels each having a capacity of 50 Mbps. There is no assignment of LSPs to backup tunnels that will work even though their total capacity exceeds the total requirements of the LSPs. The packing algorithm will then fail.

If the backup tunnels are being configured and assigned after the LSPs have been established, the preferred response to such a failure of the packing algorithm will be to allocate additional backup tunnel capacity by increasing the bandwidth of one or more backup tunnels or adding new backup tunnels. This may be done iteratively until the packing algorithm can successfully assign all LSPs to backup tunnels.

If the packing algorithm is invoked for new LSPs as they are established, it may be preferable to reject LSPs for which the packing algorithm fails. This can be done by sending an RSVP PathErr message to the head end of the LSP. Alternatively, an LSP may be established, but not associated with any backup tunnels. In this case an error message may be returned to the head end of the LSP, and in case of a failure packets of this LSP will not be rerouted via any of the backup bandwidth.

It will be appreciated that the benefits of load balancing are brought to providing efficient bandwidth protection for fast reroute. M backup tunnels may protect N paths. Backup bandwidth, signaling, and router state resources used to provide protection are used efficiently.

Network Device Details

Figure 1:
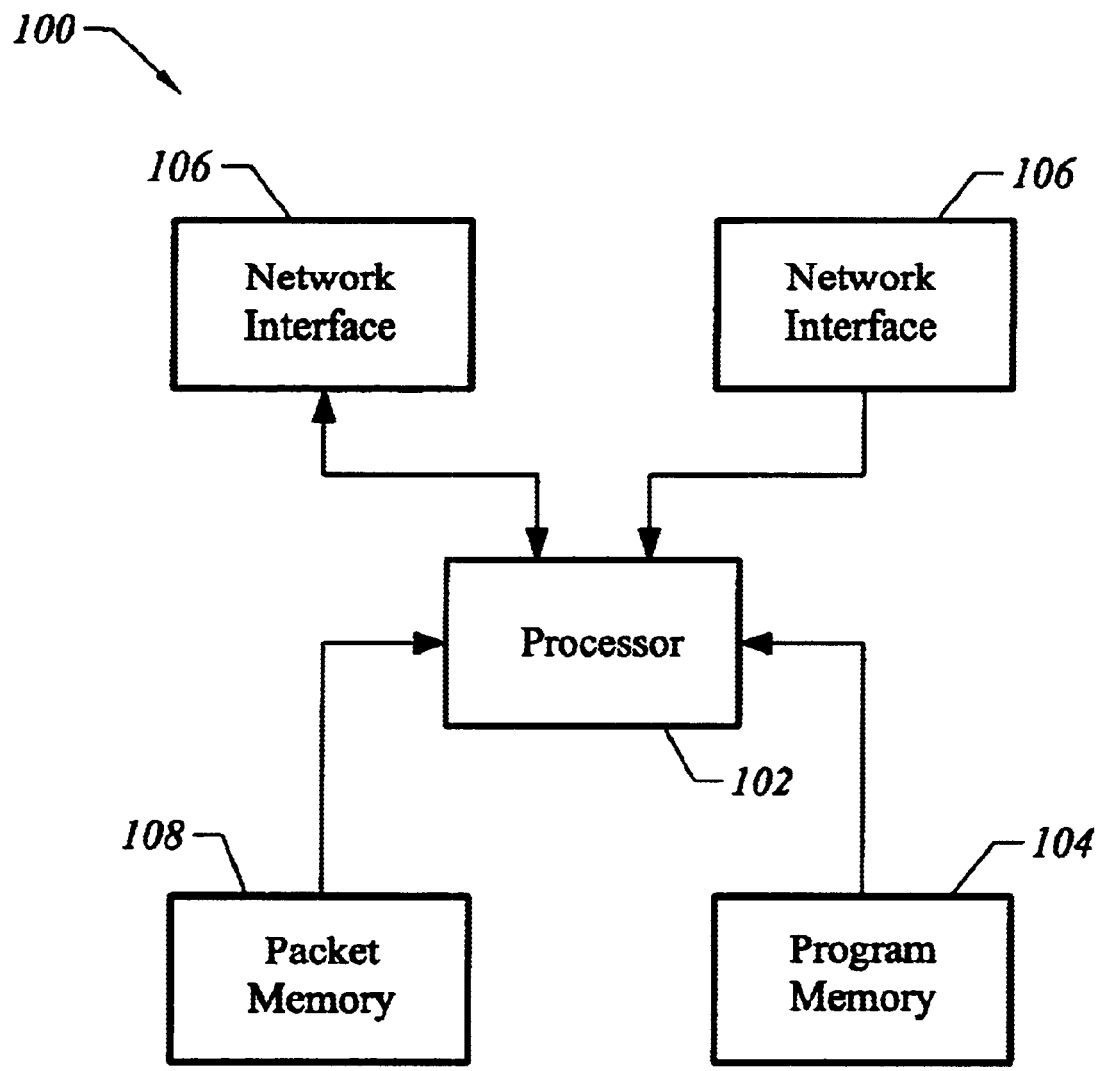
FIG. 1 depicts a network device according to one embodiment of the present invention.

FIG. 1 depicts a network device 100 that may be used to implement any of the described nodes or a network management workstation. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 100, they may be stored in a packet. memory 108. Network device 100 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for providing fast reroute protection in a label switched network, said method comprising:
   identifying N parallel paths to be protected together, said N paths originating at a first selected node of said label switched network and terminating at a second selected node of said label switched network;
   identifying M backup tunnels to protect said N parallel paths; and
   selecting for each of a plurality of label switched paths employing any of said N parallel paths, one of said M backup tunnels as a backup to use upon failure; wherein N or M is greater than or equal to 2; and
   wherein selecting comprises employing a packing algorithm to match bandwidth requirements of said label switched paths to bandwidth capacities of said backup tunnels; and
   wherein selecting further comprises, if bandwidth requirements of said label switched paths cannot initially be matched to bandwidth capacities of said backup tunnels, increasing M to identify at least one additional backup tunnel and then repeating said packing algorithm.

2. A method for providing fast reroute protection in a label switched network, said method comprising:
   identifying N parallel paths to be protected together, said N paths originating at a first selected node of said label switched network and terminating at a second selected node of said label switched network;
   identifying M backup tunnels to protect said N parallel paths; and
   selecting for each of a plurality of label switched paths employing any of said N parallel paths, one of said M backup tunnels as a backup to use upon failure; wherein N or M is greater than or equal to 2; and
   wherein selecting comprises employing a packing algorithm to match bandwidth requirements of said label switched paths to bandwidth capacities of said backup tunnels; and
   wherein selecting further comprises, if bandwidth requirements of said label switched paths cannot initially be matched to bandwidth capacities of said backup tunnels, reconfiguring bandwidth of at least one of said M backup tunnels and then repeating said packing algorithm.

3. A method for providing fast reroute protection in a label switched network, said method comprising:
   identifying N parallel paths to be protected together, said N paths originating at a first selected node of said label switched network and terminating at a second selected node of said label switched network;
   identifying M backup tunnels to protect said N parallel paths; and
   selecting for each of a plurality of label switched paths employing any of said N parallel paths, one of said M backup tunnels as a backup to use upon failure; wherein N or M is greater than or equal to 2; and
   wherein selecting comprises employing a packing algorithm to match bandwidth requirements of said label switched paths to bandwidth capacities of said backup tunnels; and
   wherein selecting further comprises, for each label switched path, selecting the backup tunnel that has the least remaining available bandwidth from the backup tunnels of said M backup tunnels that have sufficient remaining available backup bandwidth to accommodate the label switched path bandwidth.

4. The method of claim 3 wherein identifying said N parallel paths and said M backup tunnels and selecting are performed at said first selected node.

5. A computer program product for providing fast reroute protection in a label switched network, said computer program product comprising:
   code that causes identification of N parallel paths to be protected together, said N paths originating at a first selected node of said label switched network and terminating at a second selected node of said label switched network;
   code that causes identification of M backup tunnels to protect said N parallel paths;
   code that causes selection of, for each of a plurality of label switched paths employing any of said N parallel paths, one of said M backup tunnels as a backup to use upon failure; wherein N or M is greater than or equal to 2; and
   a computer-readable medium that stores the codes; and
   wherein said code that causes selection comprises code that causes employment of a packing algorithm to match bandwidth requirements of said label switched paths to bandwidth capacities of said backup tunnels; and
   wherein said code that causes selection further comprises:
   code that, if bandwidth requirements of said label switched paths cannot initially be matched to bandwidth capacities of said backup tunnels, causes increase of M to identify at least one additional backup tunnel and then repeating said packing algorithm.

6. A computer program product for providing fast reroute protection in a label switched network, said computer program product comprising:
   code that causes identification of N parallel paths to be protected together, said N paths originating at a first selected node of said label switched network and terminating at a second selected node of said label switched network;
   code that causes identification of M backup tunnels to protect said N parallel paths;
   code that causes selection for each of a plurality of label switched paths employing any of said N parallel paths, one of said M backup tunnels as a backup to use upon failure; wherein N or M is greater than or equal to 2; and
   a computer-readable medium that stores the codes; and
   wherein said code that causes selection comprises code that causes employment of a packing algorithm to match bandwidth requirements of said label switched paths to bandwidth capacities of said backup tunnels; and
   wherein said code that causes selection further comprises:
   code that, if bandwidth requirements of said label switched paths cannot initially be matched to bandwidth capacities of said backup tunnels, causes reconfiguration of bandwidth of at least one of said M backup tunnels and then repeats said packing algorithm.

7. A computer program product for providing fast reroute protection in a label switched network, said computer program product comprising:

code that causes identification of N parallel paths to be protected together, said N paths originating at a first selected node of said label switched network and terminating at a second selected node of said label switched network;

code that causes identification of M backup tunnels to protect said N parallel paths;

code that causes selection for each of a plurality of label switched paths employing any of said N parallel paths, one of said M backup tunnels as a backup to use upon failure; wherein N or M is greater than or equal to 2; and a computer-readable medium that stores the codes; and wherein said code that causes selection comprises code that causes employment of a packing algorithm to match bandwidth requirements of said label switched paths to bandwidth capacities of said backup tunnels; and wherein said code that causes employment said packing algorithm comprises:

code that, for each label switched path, causes selection of the backup tunnel that has the least remaining available bandwidth from the backup tunnels of said M backup tunnels that have sufficient remaining available backup bandwidth to accommodate the label switched path bandwidth.

8. A network device comprising:

a processor; and a memory storing instructions executed by said processor, said instructions comprising:

code that causes identification of N parallel paths to be protected together, said N paths originating at a first selected node of said label switched network and terminating at a second selected node of said label switched network;

code that causes identification of M backup tunnels to protect said N parallel paths; and code that causes selection of, based on bandwidth requirements of said label switched paths and bandwidth capacities of said M backup tunnels, for each of a plurality of label switched paths employing any of said N parallel paths, one of said M backup tunnels as a backup to use upon failure; wherein N or M is greater than or equal to 2; and wherein said code that causes selection comprises code that causes employment of a packing algorithm to match bandwidth requirements of said label switched paths to bandwidth capacities of said backup tunnels; and wherein said code that causes selection further comprises:

code that, if bandwidth requirements of said label switched paths cannot initially be matched to bandwidth capacities of said backup tunnels, causes increase of M to identify at least one additional backup tunnel and then repeating said packing algorithm.

9. A network device comprising:

a processor; and a memory storing instructions executed by said processor, said instructions comprising:

code that causes identification of N parallel paths to be protected together, said N paths originating at a first selected node of said label switched network and terminating at a second selected node of said label switched network;

code that causes identification of M backup tunnels to protect said N parallel paths; and code that causes selection for each of a plurality of label switched paths employing any of said N parallel paths, one of said M backup tunnels as a backup to use upon failure; wherein N or M is greater than or equal to 2; and wherein said code that causes selection comprises code that employs a packing algorithm to match bandwidth requirements of said label switched paths to bandwidth capacities of said backup tunnels; and wherein said code that causes selection further comprises:

code that, if bandwidth requirements of said label switched paths cannot initially be matched to bandwidth capacities of said backup tunnels, causes reconfiguration of bandwidth of at least one of said M backup tunnels and then repeats said packing algorithm.

10. A network device comprising:

a processor; and a memory storing instructions executed by said processor, said instructions comprising:

code that causes identification of N parallel paths to be protected together, said N paths originating at a first selected node of said label switched network and terminating at a second selected node of said label switched network;

code that causes identification of M backup tunnels to protect said N parallel paths; and code that causes selection of for each of a plurality of label switched paths employing any of said N parallel paths, one of said M backup tunnels as a backup to use upon failure; wherein N or M is greater than or equal to 2; and wherein said code that causes selection comprises code that causes employment of a packing algorithm to match bandwidth requirements of said label switched paths to bandwidth capacities of said backup tunnels; and wherein said code that causes employment of said packing algorithm comprises:

code that, for each label switched path, causes selection of the backup tunnel that has the least remaining available bandwidth from the backup tunnels of said M backup tunnels that have sufficient remaining available backup bandwidth to accommodate the label switched path bandwidth.

11. Apparatus for providing fast reroute protection in a label switched network, said apparatus comprising:

means for identifying N parallel paths to be protected together, said N paths originating at a first selected node of said label switched network and terminating at a second selected node of said label switched network;

means for identifying M backup tunnels to protect said N parallel paths; and means for selecting, in advance of a failure, for each of a plurality of label switched paths employing any of said N parallel paths, one of said M backup tunnels as a backup to use upon said failure; wherein N or M is greater than or equal to 2, wherein selecting is based on bandwidth requirements of said label switched paths and bandwidth capacities of said M backup tunnels; and wherein said means for selecting comprises:

means for employing a packing algorithm to match bandwidth reciuirements of said label switched paths to bandwidth capacities of said backup tunnels; and means for, if bandwidth reciuirements of said label switched paths cannot initially be matched to bandwidth capacities of said backup tunnels, reconfiguring bandwidth of at least one of said M backup tunnels and then repeating said packing algorithm.

12. The method of claim 2 wherein N is greater than M and said N parallel paths are protected against simultaneous failure.

13. The computer program product of claim 5 wherein N is greater than M and said N parallel paths are protected against simultaneous failure.

14. The network device of claim 10 wherein N is greater than M and said N parallel paths are protected against simultaneous failure.

* * * * *